(12) United States Patent
Honnorat et al.

(10) Patent No.: US 8,562,075 B2
(45) Date of Patent: Oct. 22, 2013

(54) ENERGY ABSORBER ELEMENT

(75) Inventors: Olivier Honnorat, Aix en Provence (FR); Thomas Manfredotti, La Colle sur Loup (FR)

(73) Assignee: Eurocopter, Marignane Cedex (FR)

( * ) Notice: Subject to any disclaimer, the term of this patent is extended or adjusted under 35 U.S.C. 154(b) by 441 days.

(21) Appl. No.: 12/431,074

(22) Filed: Apr. 28, 2009

(65) Prior Publication Data

US 2009/0267391 A1 Oct. 29, 2009

(30) Foreign Application Priority Data

Apr. 28, 2008 (FR) ...................................... 08 02366

(51) Int. Cl.
*A62B 35/04* (2006.01)
(52) U.S. Cl.
USPC ............. 297/472; 188/371; 267/74; 267/165
(58) Field of Classification Search
USPC ............. 297/472, 471; 188/371, 374; 267/74, 267/153, 158, 160, 164–165
See application file for complete search history.

(56) References Cited

U.S. PATENT DOCUMENTS

| | | | | |
|---|---|---|---|---|
| 1,433,201 A | * | 10/1922 | Grant | 267/165 |
| 3,198,288 A | * | 8/1965 | Presunka | 297/472 |
| 3,447,833 A | | 6/1969 | Rice | |
| 3,482,872 A | | 12/1969 | Chamberlain | |
| 3,724,603 A | * | 4/1973 | Shiomi et al. | 188/371 X |
| 3,985,388 A | | 10/1976 | Hogan | |
| 4,832,320 A | * | 5/1989 | Scowen et al. | 267/165 X |
| 5,125,598 A | | 6/1992 | Fox | |
| 6,767,057 B2 | * | 7/2004 | Neelis | 297/472 |
| 7,520,555 B2 | * | 4/2009 | Malapati et al. | 297/253 X |

FOREIGN PATENT DOCUMENTS

| | | |
|---|---|---|
| BE | 646747 | 8/1964 |
| EP | 0814020 | 12/1997 |
| EP | 0927659 | 7/1999 |
| FR | 2695177 | 3/1994 |
| GB | 1077322 | 7/1967 |
| GB | 2269647 A * | 2/1994 |

OTHER PUBLICATIONS

French Search Report for FR0802366, dated Oct. 30, 2008.
French Search Report for FR 0802359, dated Nov. 7, 2008.
Co-pending U.S. Appl. No. 12/431,097, filed Apr. 28, 2009, entitled "A crashworthy seat for a vehicle".

* cited by examiner

*Primary Examiner* — Anthony D Barfield
(74) *Attorney, Agent, or Firm* — Brooks Kushman P.C.

(57) ABSTRACT

An energy absorber element comprises an absorber portion having first and second distal ends and having a first elongate element and a second elongate element facing the first elongate element and connected to the second element solely at the first and second distal ends, a first anchor point secured to the first distal end of the absorber portion, and a second anchor point secured to the second distal end of the absorber portion, wherein each of the first and second elongate elements includes a succession of straight-line segments parallel to one another and at least one circularly-arcuate segment such that at least two successive straight-line segments are connected together by one of the at least one circularly-arcuate segment.

17 Claims, 1 Drawing Sheet

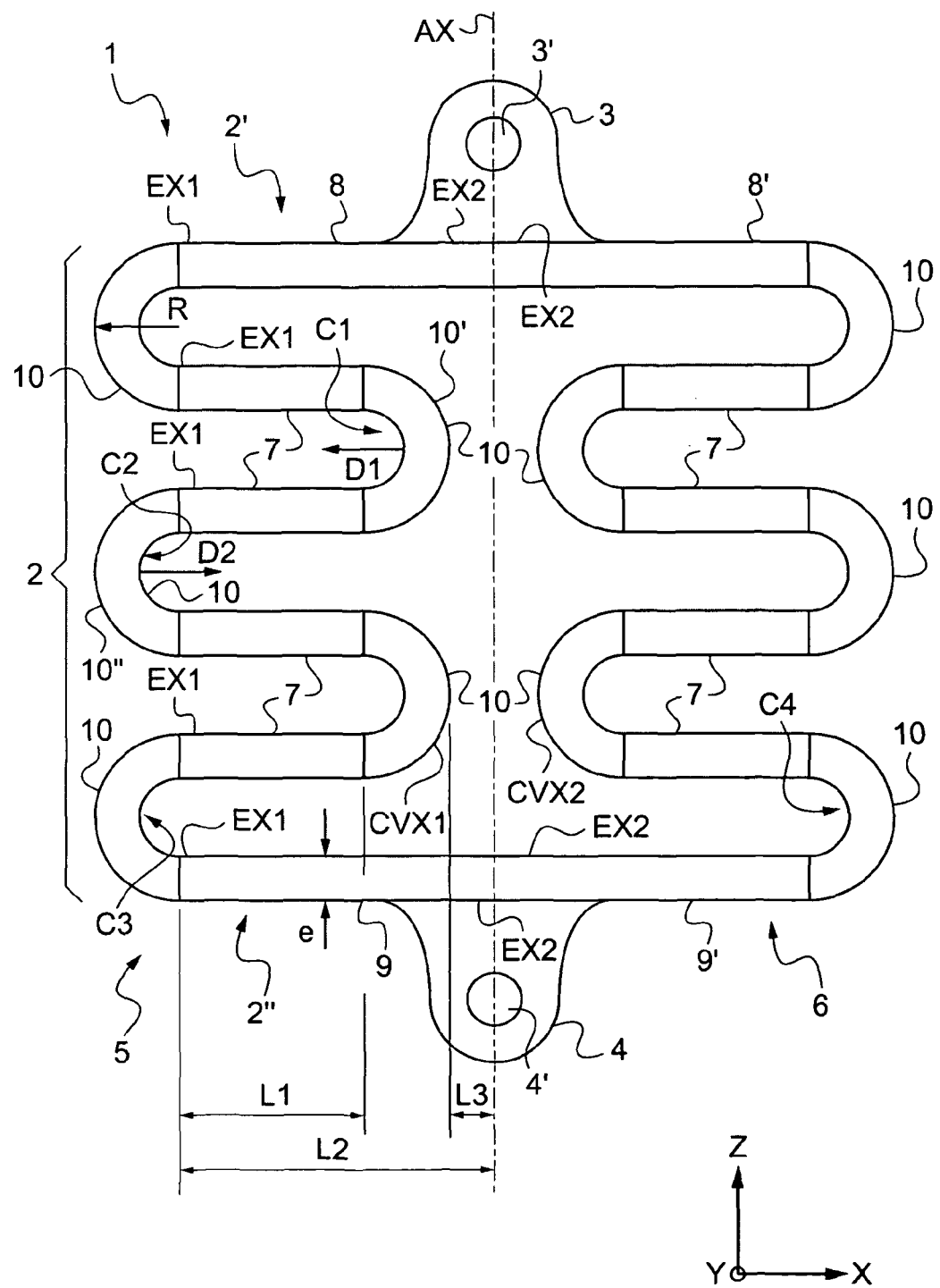

ENERGY ABSORBER ELEMENT

Priority is claimed to French Application No. FR 08 02366, filed on Apr. 28, 2008, the entire disclosure of which is incorporated by reference herein.

The present invention relates to an energy absorber element.

In order to dissipate energy, e.g. the kinetic energy of a helicopter seat during a hard landing, it is appropriate to use at least one absorber element.

BACKGROUND

By way of example, document U.S. Pat. No. 3,482,872 discloses an absorber element provided with an absorber portion comprising a single elongate absorber element. In contrast, document U.S. Pat. No. 3,447,833 presents an absorber element provided with an absorber portion that is secured to first and second means for anchoring to a floor. The absorber portion then has first and second elongate elements, the first elongate element being secured via one of its ends to the first anchor means and via its other end to the second elongate element. Similarly, the second elongate element is secured via one of its ends to the second anchor means and via its other ends to the first elongate element.

Document FR 2 695 177 discloses an absorber element comprising firstly a succession of closed loops suitable for deforming plastically in a direction substantially perpendicular to their initial orientation so as to open progressively as a function of the applied traction force, and secondly engagement means, at one end for engaging a stationary anchor point, and at the opposite end for engaging a moving anchor point. Plastic deformation of the absorber element then absorbs the energy generated by the phenomenon that gave rise to the traction. In order to obtain the loops of the absorber element, cutouts are made in a rectangular plate, the cutouts being distributed so as to form a succession of mutually parallel rows that are perpendicular to the longitudinal axis of the plate. Every other row then has a central cutout co-operating with the edges of the plate to form a solid plate portion representing a closed loop. The other rows then have two side cuts, each including firstly an open end opening out into the corresponding edge of said plate, and secondly a semicircular closed end co-operating with the adjacent cutout to form solid plate portions. The lateral cuts in a row then separate two adjacent closed loops. Although effective, it should be observed that the semicircular shape of the closed ends of the cutouts leads to variations in the section of the absorber element. High levels of stress concentration can then be observed where the section varies, and these can lead to the absorber element breaking.

Consequently, that absorber element is difficult to implement in an anti-crash seat of a helicopter, given the forces to which it is subjected during the crash of a vehicle, in particular an aircraft of the rotorcraft type. One solution might consist in reinforcing the weakened zone. Nevertheless, that solution would give rise to extra costs.

SUMMARY OF THE INVENTION

An aspect of the present invention is to provide an absorber element that is strong enough to be capable of being implemented in an anti-crash seat and that is of reasonable cost.

According to the present invention, an energy absorber element is provided with an absorber portion, a first anchor point, and a second anchor point, first and second distal ends of said absorber portion being secured respectively to first and second anchor points. Furthermore, the absorber portion comprises at least one solid elongate element optionally of constant thickness that deforms elastically when subjected to traction below a predetermined threshold, and plastically when subjected to traction above said predetermined threshold, said at least one elongate element being provided with a succession of straight-line segments that are mutually parallel and of circularly-arcuate segments in such a manner as to have at least two successive straight-line segments interconnected by a circularly-arcuate segment. As used herein, parallel is understood to mean substantially parallel.

When traction is applied to the second anchor point, each circularly-arcuate segment tends to straighten out, being deformed elastically or plastically, with this elastic or plastic deformation giving it the ability to absorb energy.

By definition, the elongate element of the absorber portion of the absorber element is of a shape that is very long relative to its transverse dimension, the developed length of each elongate element being much greater than its thickness. Thus, the elongate element may be a wire, presenting a section of a variety of shapes, not necessarily a circular section. Furthermore, the elongate element advantageously comprises a metal material so as to present characteristics that are good in terms of elastic and plastic deformation. In spite of its low cost, this absorber element is particularly strong, which means that it can be implemented in an anti-crash seat.

In addition to the main and optional characteristics presented above, the absorber element may include one or more of the following additional characteristics. Advantageously, each of the first and second distal ends comprises a straight-line segment, thereby making it easier to secure to the first and second anchor points.

In addition, the elongate element includes a plurality of circularly-arcuate segments, each presenting a concave side, a first circularly-arcuate segment being connected to a second circularly-arcuate segment that follows it by means of a straight-line segment, and the first concave side of said first circularly-arcuate segment faces in a first direction opposite from a second direction in which the second concave side of said second circularly-arcuate segment faces. Thus, the elongate element presents an undulating or sinuous shape. This characteristic facilitates elongation of the absorber element, thereby maximizing its power of absorption.

Furthermore, each circularly-arcuate segment is optionally in the form of a regular semicircle and/or has a radius greater than or equal to two millimeters. For the person skilled in the art, a radius greater or equal to two millimeters amounts to saying that each circularly-arcuate segment represents a portion of the periphery of a geometrical circle of radius greater than or equal to two millimeters. Thus, the elongate element does not present major concentrations of stress and therefore does not run the risk of breaking in untimely manner.

In order to optimize the efficiency of the absorber element, it comprises not one but a first and second elongate elements facing each other, being interconnected solely via their end straight line zones. For each elongate element having a primary straight-line segment at its first end zone and a secondary straight-line segment at its second end zone, the first and second elongate elements are interconnected solely via their end zones so as to form first and second distal ends of the absorber portion. Thus, the primary straight-line segment of the first elongate element is secured to the primary straight-line segment of the second elongate element to form the first distal end of the absorber portion, these primary straight-line segments thus forming a single straight-line segment to which the first anchor point is secured. Similarly, the secondary straight-line segment of the first elongate element is secured to the secondary straight-line segment of the second elongate element to form the second distal end of the absorber portion, these secondary straight-line segments thus forming a single straight-line segment to which the second anchor point is secured.

In addition, each elongate element has identical intermediate straight-line segments between its primary and secondary straight-line segments, which intermediate segments are of a first length, while the primary and secondary straight-line segments are identical and are of a second length, where the second length is greater than the first length.

It can be understood that each elongate element comprises a plurality of straight-line segments, the straight-line segment of the first end zone of an elongate element being referred to as the primary straight-line segment, the straight-line segment of the second end zone of an elongate element being referred to as the secondary straight-line segment, and the straight-line segments between the straight-line segment of the first end zone and the straight-line segment of the second end zone being referred to as intermediate straight-line segments for reasons of clarity. Consequently, the first length of the straight-line segments lying between the straight-line segment of the first end zone and the straight-line segment of the second end zone is shorter than the second length of the straight-line segments of the first and second end zones.

Thus, each circularly-arcuate segment of the second elongate element is spaced apart from each circularly-arcuate segment of the first elongate element in such a manner as not to touch, thereby enhancing the capacity of the absorber element to lengthen in traction.

Furthermore, the first and second elongate elements are identical and face each other, each straight-line segment of the second elongate element is in axial alignment with a straight-line segment of the first elongate element, and the intermediate straight-line segments of the first elongate element are spaced part from the intermediate straight-line segments of the second elongate element so as not to touch them.

Finally, it is advantageous to have an absorber element made as a single piece, with the elongate element(s) of the absorber element and the first and second anchor points all being obtained by machining a common block of material.

Furthermore, the absorber portion is ideally contained in a plane of material for working in a preferred direction in order to maximize its effectiveness, and said block of material is in the form of a plane plate.

Consequently, the absorber element, and thus its absorber portion and each of its elongate elements, made from said plane plate, are all contained in a common plane. The cost of fabricating the absorber element is thus relatively small, whereas the performance of said absorber element is optimized.

BRIEF DESCRIPTION OF THE DRAWING

The invention and its advantages appear in greater detail in the context of the following description of an embodiment given by way of illustration and with reference to the sole accompanying FIGURE.

The sole FIGURE is a face view of a plane absorber element 1 of the invention.

DETAILED DESCRIPTION

Three mutually orthogonal directions written X, Y, and Z are shown in the FIGURE. The direction X is said to be "longitudinal" while another direction Y is said to be "transverse." Finally, a third direction Z is said to be an "elevation" direction and corresponds to the height dimensions of the structures described.

The absorber element comprises in succession a first anchor point 3, an absorber portion 2, and then a second anchor point 4. It can be seen that the first distal end 2' of the absorber portion 2 is secured to the first anchor point 3, while the second distal end 2" of the absorber portion 2 is secured to the second anchor point 4.

It should be observed that the first and second anchor points 3, 4 are each provided with a fastener orifice 3', 4', and also that the absorber portion 2 may constitute a single piece obtained by machining a single block of material, e.g. by being cut out from a plane metal plate.

By pulling on the second anchor point 4 while keeping the first anchor point 3 stationary, traction is exerted on the absorber portion. This traction may be initiated by the downward movement of the "pan" structure of a helicopter seat while the helicopter is landing hard.

The absorber portion 2 then begins by deforming elastically and continues by deforming plastically so as to absorb the kinetic energy of the pan so as to slow down and reduce the descent thereof.

Initially, the absorber portion comprises an elongate element 5 of constant thickness e, such as a wire, made up of six mutually parallel straight-line segments 7, 8, 9 directed in the longitudinal direction X, and five circularly-arcuate segments 10.

It should be observed that these numbers of straight-line segments and of circularly-arcuate segments as mentioned above are purely indicative and are not limiting. The first elongate element should have at least two straight-line segments interconnected by one circularly-arcuate segment.

The first elongate element thus comprises a succession of straight line and circularly-arcuate segments, a straight-line segment 7, 8, or 9 succeeding and/or preceding a circularly-arcuate segment 10, and a circularly-arcuate segment 10 succeeding and/or preceding a straight-line segment 7, 8, or 9.

More precisely, the first end zone 2' of the absorber element 1, and thus the first distal end zone 2' of the first elongate element 5, is provided with a straight-line segment referred to as the primary segment 8.

Similarly, the second end zone 2" of the absorber element 1, and thus the second distal end 2" of the first elongate element 5, is provided with a straight-line segment referred to as the secondary segment 9.

The primary and secondary straight-line segments 8 and 9 are identical and they extend over a second length L2. Between these first and second end zones 2' and 2", the straight-line segments are straight lines referred to as intermediate straight-line segments 7 extending along a first length L1 that is shorter than the second length L2. Finally, the straight-line segments are placed one above another. Furthermore, the circularly-arcuate segments 10 are all identical, each being in the form of a regular semicircle of radius R that is greater than two millimeters.

It should be observed that the difference between the second length L2 and the first length L1 is greater than the radius R, which means that the inner ends EX2 of the primary and secondary straight-line segments 8 and 9 form projections of the first elongate element 5. Furthermore, the first and second concave sides C1, C2 of two successive circularly-arcuate segments 10' and 10", i.e. two segments connected to common intermediate straight-line segments, are directed in first and second directions D1, D2 that are parallel and opposite, these first and second directions D1 and D2 not coinciding. The first elongate element 5 is thus of an undulating shape.

Secondly, the absorber portion 2 has a second elongate element 6. It should be observed that the second elongate element 6 is not essential.

With reference to the sole FIGURE, the second elongate element 6 is identical to the first elongate element 5. In addition, the second elongate element 6 is symmetrically secured to the first elongate element 5 about the longitudinal axis of symmetry AX of the absorber element. The first and second elongate elements 5 and 6 thus face each other.

More precisely, the first and second elongate elements are secured to each other solely via their first and second end zones 2' and 2''. Thus, the primary straight-line segment 8 of the first elongate element 5 is secured to the primary straight-line segment 8' of the second elongate element 6, the secondary straight-line segment 9 of the first elongate element 6 being secured to the secondary straight-line segment 9' of the second elongate element 6.

Because of the symmetry of the first and second elongate elements 5, 6, each straight-line segment of the second elongate element 6 is in alignment with a straight-line segment of the first elongate element 5.

Similarly, each circularly-arcuate segment of the second elongate element 5 is in alignment with a circularly-arcuate segment of the first elongate element 5, but does not touch it. Thus, each outer circularly-arcuate segment of the first elongate element 5 is at a second length L2 from the axis of symmetry AX, having its concave side facing the concave side of an outer circularly-arcuate segment of the second elongate element 6, that is itself at a second length L2 from the axis of symmetry AX. By way of example, the concave sides C3 and C4 thus face each other.

Furthermore, two aligned outer circularly-arcuate segments of the first and second elongate elements 5 and 6 are spaced apart from each other by a distance corresponding to twice the second length L2, i.e. the sum of the second lengths L2 of the primary or secondary straight-line segments 8, 8', or 9, 9'. In contrast, each inner circularly-arcuate segment of the first elongate element 5 is at a third length L3 from the axis of symmetry AX that is equal to the second length L2 minus the radius R and minus the first length L1, with its convex side facing the convex side of an outer circularly-arcuate segment of the second elongate element 6 that is likewise at a third length L3 from that axis of symmetry AX equal to the second length minus the radius R and the first length L1. By way of example, the convex sides CVX1 and CVX2 thus face each other.

Furthermore, two inner and aligned circularly-arcuate segments of the first and second elongate elements 5 and 6 are spaced apart by a distance corresponding to twice the third length L3. The present invention may be subjected to numerous variations as to its implementation. Although several embodiments are described, it will readily be understood that it is not conceivable to identify exhaustively all possible embodiments. It is possible to envisage replacing any of the means described by equivalent means without going beyond the ambit of the present invention.

It should be observed that it is possible to implement a plurality of absorber elements in series or in parallel on a common piece of equipment, e.g. a seat, in order to adapt the overall absorption characteristics. In series, the absorber elements are disposed one above the other, the first anchor point of one absorber element being fastened to the second anchor point of the absorber element located above it, for example.

In contrast, in parallel, the absorber elements are arranged one against another, the first anchor points of each absorber element being for example engaged on first anchor means of said piece of equipment, while the second anchor points of each of the absorber elements are engaged on a second anchor means of said piece of equipment.

What is claimed is:

1. An energy absorber element comprising:
   an absorber portion having a first elongate element and a second elongate element, wherein each of the first and second elongate elements includes at least four straight-line segments spaced apart in an elevation direction and being mutually parallel to one another, and a plurality of semi-circular segments such that at each of the successive straight-line segments are connected together by one of the semi-circular segments, wherein the first and second elongate elements are connected at a first and second distal end to form a single-piece continuous loop;
   a first anchor point having a first anchor aperture and fixedly secured to the first distal end of the absorber portion so that the first anchor point is stationary with respect to the absorber portion; and
   a second anchor point having a second anchor aperture and fixedly secured to the second distal end of the absorber portion so that the second anchor point is stationary with respect to the absorber portion,
   wherein the first and the second elongate elements deform elastically when subjected to traction in the elevation direction below a predetermined threshold and plastically when subjected to traction in the elevation direction above the predetermined threshold.

2. The energy absorber element as recited in claim 1, wherein the straight-line segments and the semi-circular segments are shaped to define a generally sinusoidal shape extending in the elevation direction.

3. The energy absorber element as recited in claim 2, wherein the semi-circular segments includes at least one inner semi-circular segment having a first concave side facing in a first direction perpendicular to the elevation direction and connecting a first straight-line segment to a second straight-line segment and at least one outer semi-circular segment having a second concave side facing in a second direction opposite the first direction and connecting the second straight-line segment to a third straight-line segment in the plurality of straight-line segments.

4. The energy absorber element as recited in claim 1, wherein the straight-line segments includes a plurality of intermediate straight-line segments disposed between a pair of primary straight-line segments wherein the primary straight-line segments have a length greater than the intermediate straight-line segments.

5. The energy absorber element as recited in claim 4, wherein each intermediate straight-line segment of the second elongate element is in alignment with and spaced apart from each intermediate straight-line segment of the first elongate element.

6. The energy absorber element as recited in claim 1, wherein the second elongate element is disposed symmetrically to the first elongate element about a longitudinal axis of symmetry being parallel to the elevation direction extending from the first distal end of the absorber element to the second distal end.

7. An energy absorber element comprising:
   an absorber portion comprising:
      first and second elongate elements each having a primary straight-line segment, wherein the first and second elongate elements define first and second distal ends of the absorber portion;

a plurality of straight-line segments spaced apart in an elevation direction and mutually parallel to one another to the primary straight-line segments;
a plurality of arcuate segments such that at least two successive straight-line segments are connected together by at least one of the arcuate segments,
wherein the absorber portion is arranged to define a continuous one-piece loop;
a first anchor point fixedly secured along the first distal end of the energy absorber element; and
a second anchor point fixedly secured along the second distal end of the energy absorber element,
wherein the absorber portion deforms elastically when subjected to traction in the elevation direction below a predetermined threshold and deforms plastically when subjected to traction in the elevation direction above the predetermined threshold,
wherein the plurality of arcuate segments comprise a plurality of semi-circular segments connected to the straight-line segments to define a generally sinusoidal shape extending in the elevation direction, wherein at least one inner semi-circular segment having a first concave side facing in a first direction perpendicular to the elevation direction and connecting a first straight-line segment to a second straight-line segment in the plurality of straight-line segments and at least one outer segment having a second concave side facing in a second direction opposite the first direction and connecting the second straight-line segment to a third straight-line segment in the plurality of straight-line segments.

8. The energy absorber element as recited in claim 7, wherein the plurality of straight line segments comprises at least three straight line segments.

9. The energy absorber element as recited in claim 7, wherein each succession of the plurality of straight-line segments includes have a first length, and wherein the primary straight-line segments have a second length greater than the first length.

10. The energy absorber element as recited in claim 7, wherein each of the plurality of arcuate segments of the second elongate element is spaced apart from each other in the elevation direction.

11. The energy absorber element as recited in claim 7, wherein the plurality of straight-line segments and the plurality of arcuate segments define a generally sinusoidal shape.

12. The energy absorber element as recited in claim 11 further comprising at least two sinusoidal shapes defined by the plurality of straight-line segments and arcuate segments wherein the at least two sinusoidal shapes are disposed symmetrically about a central longitudinal axis of symmetry extending from the first distal end of the absorber element to the second distal end.

13. The energy absorber element as recited in claim 7 wherein the first anchor point and second anchor point are fixedly secured to the respective distal end of the absorber portion so that the second anchor point is stationary with respect to the energy absorber portion.

14. An energy absorber element comprising:
first and second elongate elements each having a primary straight-line segment, wherein the first and second elongate elements define first and second distal ends of the energy absorber element;
two energy absorber connection portions connecting the first and second elongate elements an elevation direction to define a continuous one-piece loop, each of the connection portions having an undulating shape formed by a plurality of straight-line segments each connected by an arcuate segment, the straight-line segments being spaced apart in the elevation direction and positioned parallel to one another and parallel to the primary straight-line segments, and
first and second anchor portions fixedly secured to the first and second distal ends respectively,
wherein the energy absorber element deforms elastically when the first and second anchor portions are subjected to traction in the elevation direction below a predetermined threshold and deforms plastically when subjected to traction in the elevation direction above the predetermined threshold,
wherein the arcuate segments further comprise a plurality of semi-circular segments, wherein the undulating shape includes at least one inner semi-circular segment having a first concave side facing in a first direction perpendicular to the elevation direction and connecting a first straight-line segment to a second straight-line segment in the plurality of straight-line segments and at least one outer segment having a second concave side facing in a second direction opposite the first direction and connecting the second straight-line segment to a third straight-line segment in the plurality of straight-line segments.

15. The energy absorber element as recited in claim 14, wherein the undulating shape of each of the absorber connection portions has a generally sinusoidal shape in the elevation direction.

16. The energy absorber element as recited in claim 14 wherein the at least two energy absorber connection portion are mirror images of each other and disposed symmetrically about a longitudinal axis of symmetry being parallel to the elevation direction and extending from the first distal end of the absorber element to the second distal end.

17. The energy absorber element as recited in claim 14 wherein the first anchor point and second anchor point are fixedly secured to the respective distal end of the absorber portions so that the second anchor point is stationary with respect to the energy absorber portion.

* * * * *